United States Patent
Coley et al.

(10) Patent No.: US 7,680,759 B1
(45) Date of Patent: Mar. 16, 2010

(54) AUTOMATED METADATA VALIDATION

(75) Inventors: Mark William Coley, Apex, NC (US); Michael Chaves, Cary, NC (US); Mark Christopher Bush, Apex, NC (US); Susan Jamie Borofsky, Cary, NC (US); Michael J. Brown, Fuquay-Varina, NC (US)

(73) Assignee: Teradata US, Inc., Miamisburg, OH (US)

( * ) Notice: Subject to any disclaimer, the term of this patent is extended or adjusted under 35 U.S.C. 154(b) by 590 days.

(21) Appl. No.: 10/921,081

(22) Filed: Aug. 18, 2004

(51) Int. Cl.
*G06F 7/00* (2006.01)
*G06F 17/30* (2006.01)

(52) U.S. Cl. .................. 707/1; 707/3; 707/203

(58) Field of Classification Search .......... 707/1–10, 707/100–104.1, 200–206; 709/225; 713/157; 718/104, 105
See application file for complete search history.

(56) References Cited

U.S. PATENT DOCUMENTS

| | | | |
|---|---|---|---|
| 6,044,374 A | 3/2000 | Nesamoney et al. | 707/10 |
| 6,151,584 A | 11/2000 | Papierniak et al. | 705/10 |
| 6,208,988 B1 | 3/2001 | Schultz | 707/5 |
| 6,353,823 B1 | 3/2002 | Kumar | 707/3 |
| 6,490,590 B1 * | 12/2002 | Fink | 707/100 |
| 6,513,028 B1 * | 1/2003 | Lee et al. | 707/2 |
| 6,535,868 B1 | 3/2003 | Galeazzi et al. | 707/2 |
| 6,604,110 B1 | 8/2003 | Savage et al. | 707/102 |
| 6,915,454 B1 * | 7/2005 | Moore et al. | 714/38 |
| 6,959,326 B1 * | 10/2005 | Day et al. | 709/217 |
| 7,395,537 B1 * | 7/2008 | Brown et al. | 718/104 |

OTHER PUBLICATIONS

Panagiotis G et al., Extending SDARTS: extracting metadata from web databases and interfacing with the open archives initiative, Jul. 2002, ACM, 162-170.*
Smith et al., Joint policy management and auditing in virtual organizations, Nov. 17, 2003, IEEE, 117-124.*

* cited by examiner

*Primary Examiner*—Jean B Fleurantin
(74) *Attorney, Agent, or Firm*—Schwegman, Lundberg, Woessner

(57) ABSTRACT

An application includes a variety of metadata and operations that may process the metadata. Selective portions of the metadata are identified and various combinations of available operations are automatically generated for the selective metadata. Each generated operation is then individually validated for syntax and semantics, without actually executing the operation.

11 Claims, 3 Drawing Sheets

AUTOMATED METADATA VALIDATION

FIELD OF THE INVENTION

The present invention relates to validation and in particular to techniques for automatically validating metadata.

BACKGROUND OF THE INVENTION

Metadata is data about data. That is, metadata defines or describes primary data. For example, metadata are the field names of a database table, mappings between or within database tables, legends of database tables, hierarchies of database tables, joins associated with database tables, and the like. Of course, metadata is not restricted to database applications, because virtually all electronic applications consume primary data that is associated metadata. For example, an electronic mail (email) message may have a time of day or calendar day indicating when a message was sent or created, and this time of day or calendar day can be viewed as metadata.

In some cases, the metadata actually drives the processing of an application. For example, in database applications the metadata defines how and where primary data is acquired. Essentially, the metadata is populated as values (e.g., table names, keys, field names, etc.) within a search operation, such as an SQL search. These values then drive the search and the corresponding results (primary data) produced by the search.

Many organizations have large databases or data warehouses with a variety of database tables and field names (metadata). This is particular true for retail organizations that engage in Customer Relationship Management (CRM), where relationships between customers, products, services, stores, and the like are maintained for the entire organization. These organizations create, manage, and maintain large amounts of primary data and metadata within their databases or data warehouses. Maintaining and supporting such large amounts of primary data and metadata can be daunting.

In fact, when these organizations create new mappings or views into their data store for purposes of mining or reporting new desired features or trends, the development time associated with this exercise becomes time and resource intensive. To do this, typically, business analysts and data base administrators team up to create the new mappings or views into the data warehouse. In some instances, the hierarchies and mappings which need to be produced are themselves voluminous and complex. Once development is done, there is no efficient way for the analysts and database administrators to validate the new mappings, short of manually generating each possible combination of searches that the new mappings may generate with the metadata and then processing each possible search.

This manual construction of possible searches is often times not feasible and not practical given limited time constraints, limited human resources, and limited processing resources. Consequently, errors in defining the metadata often go undetected until a user attempts an operation that generates an invalidate search. When this occurs, an entire problem resolution process is followed until the error is properly located and fixed. This iterative process of problem resolution is not an ideal or desired situation, but is one that is conventionally deployed for large metadata applications, particularly applications associated with large data warehouses.

Therefore, there is a need for improved techniques for automatically validating metadata.

SUMMARY OF THE INVENTION

In various embodiments of this invention techniques are provided for automatically validating metadata.

More specifically, and in one embodiment, a method for validating metadata is provided. Initially, a request to validate metadata is received from within an application. Next, the metadata associated with the request is acquired and operations associated with the application generated which consume the metadata. Finally, the operations having the metadata are validated.

DETAILED DESCRIPTION OF THE INVENTION

As used herein the term "application" refers to one or more applications or system(s) that cooperate to provide one or more services. In some embodiments, the application is interfaced to a data store (e.g., directories, databases, data warehouses, electronic files, etc.), which assist the application in providing its service. In a particular embodiment of the invention, the application is the Teradata CRM product offering distributed by NCR Corporation of Dayton, Ohio. Of course, other embodiments of the invention are not restricted to any particular application or type of data store. Therefore, any application and/or data store modified to achieve the teachings presented herein is intended to fall within the generous scope of the invention.

Metadata is data about data. The metadata describes primary data and may be used as parameter data to operations of the application. That is, the metadata may be included as values for operations that the application recognizes and processes. For example, in one embodiment, the application is a database application that processes database queries (operations) and the metadata is the name of a database table and field. In this example, a particular instance of a query might look as follows: "Select (CUSTOMER_NUMBER) from table=CUSTOMER_TABLE where PURCHASES>=10." Here, the metadata is CUSTOMER_NUMBER, CUSTOMER_TABLE, and PURCHASES. The application is a database service and its operation is the query presented above which has the identified metadata.

Figure 1:
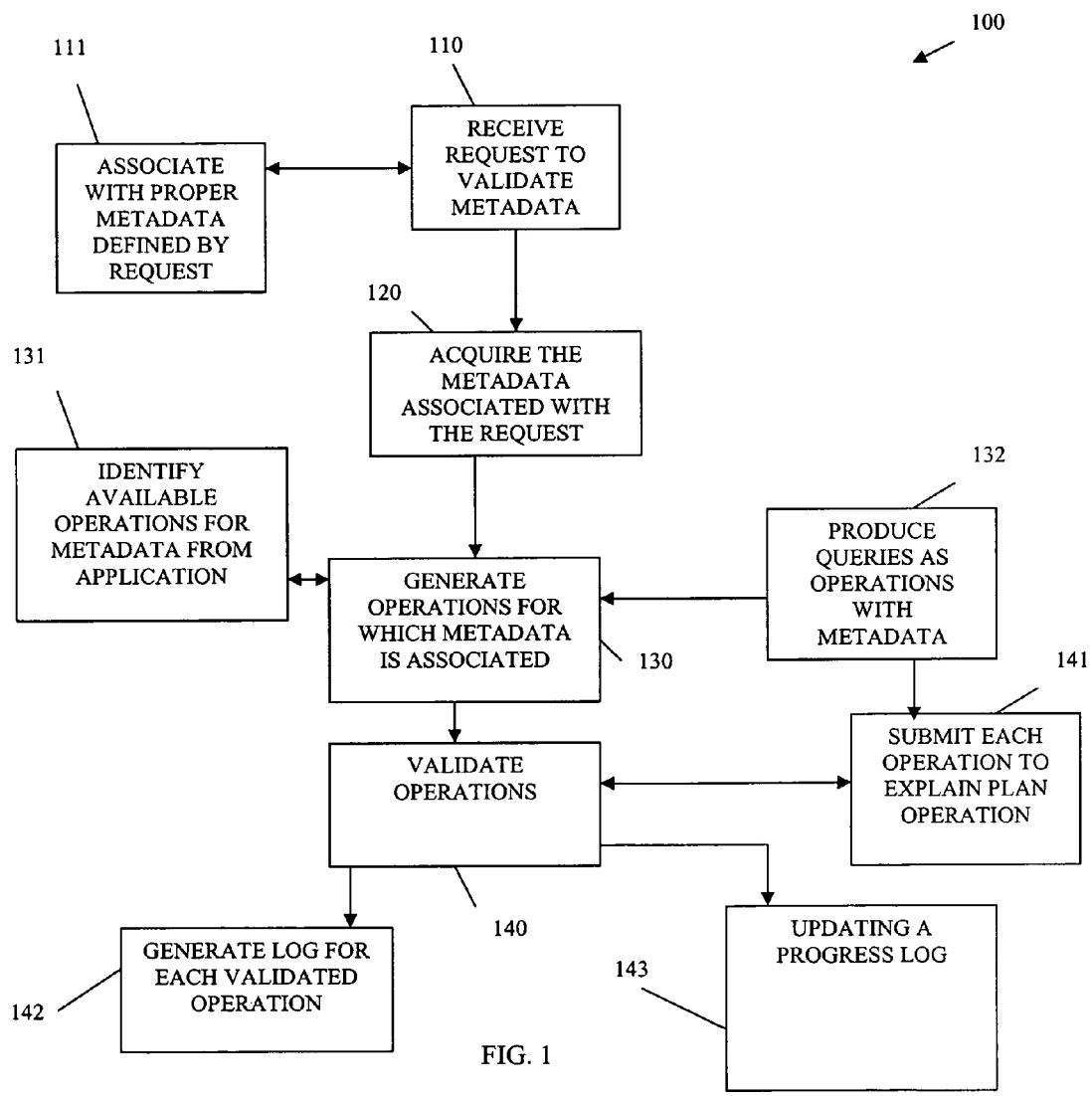
FIG. 1 depicts a diagram of a method for validating metadata, according to an example embodiment.

With this context, FIG. 1 is now explained in greater detail. FIG. 1 is a method 100 for automatically validating metadata of an application, according to an example embodiment. The method 100 (hereinafter "validation service") is implemented in a machine-accessible and readable medium. In one embodiment, the validation service is integrated with and callable from the application that it services. In one particular example embodiment, the application is a CRM product integrated with a data store and the validation service is selectable and processed directly from interfaces associated with the CRM product.

Initially, an analyst, database administrator, or developer determines that a particular sub-process or sub-service within the application is desirable and develops the same. One way to develop this sub-process or sub-service is to define a variety of metadata that may be processed by the application using operations of the application. For example, the metadata may be database hierarchies, legends, tables, keys, and/or table joins, which when accessed generate specific searches (operations) within the application using the metadata. The purposes of such a sub-service or sub-process might be to mine a data store for new trends or new reports which enable an analyst to plan, forecast, create marketing campaigns, etc.

At 110, the validation service receives a request to validate metadata. In one embodiment, that request is received from within a version of the application that is executing. That is, the request is an option or feature of the application itself. In another embodiment, the request may be made independent of the application. In this embodiment, the validation service is configured to know how to identify and acquire metadata associated with the application.

In one embodiment, at 111, the request may be associated with only a subset of all available metadata associated with an application. That is, the metadata may be logically segmented and identified as groups, such as hierarchies, legends, tables, keys, table joins, and the like. In this manner, the request may identify only a portion of all the available metadata and may therefore define the portions of metadata that will be processed by the validation service.

At 120, the metadata associated with the request is acquired. In some embodiments, this entails accessing data stores, files, directories, memory, and/or storage that is used by the application to store and index metadata. The metadata may also be associated with a type, which identifies the metadata within a logical identified group that is processed and consumed by the application. This type permits the validation service to identify operations of the application which can process the metadata. For example, a portion of the metadata identified as a table type may be processed within queries that the application issues to a data store.

Once the desired metadata is acquired according to the tenets of the request and the types or metadata are known that comprise the set of metadata acquired, operations that can process the metadata within the application are generated, at 130, with the acquired metadata. Again, in one embodiment, at 131, this may be achieved by identifying operations of the application which typically take as arguments types of metadata which exist in the acquired set of metadata.

In one embodiment, at 132, the available operations that the application uses to process the acquired metadata are data store queries, such that the validation service constructs a variety of different search queries. Each search query having selective portions of the acquired metadata. That is, all available search queries that may be produced from the acquired metadata is generated, at 132. These queries include portions of the acquired metadata as search terms within the queries.

At 140, each of the generated operations is validated, without actually executing the operations within the application. This means that the semantics and syntaxes of the operations are inspected for purposes of validation. In one embodiment, at 141, when the operations are generated as search queries, this can be achieved by executing a traditional "explain plan" operation associated with a data store query language that interfaces to the application. Each generated search query is submitted to the explain plan operation in order to perform validation.

The explain plan operation validates fields, tables, etc. (metadata) associated with a search query without actually executing the search query against the data store. This is beneficial because the syntax and semantics of a search query can be validated by the explain plan operation without actually processing against a data store. Thus, the data store is not loaded with an explain plan operation and processing resources are not unduly taxed with the explain plan operation.

As the validation service validates the metadata, output associated with each operation that is validated is serially produced. In some cases, at 142, these serially produced validation results are written to a validation log. In other embodiments, at 143, as the validation service validates it provides updates to a progress log. The progress log may allow an operator to visually discern how much of the validation the validation service has completed. The progress log may be displayed with graphics and/or text information, with information such as 10% of 100% completed, etc.

The validation results can be presented, compiled, and reported in a variety of configurable manners. For example, the validation service may only produce a file that lists just errors or suspected metadata errors. Alternatively, the validation service may produce a file that includes validated metadata along with metadata having errors. Moreover, validation results may be automatically provided to other services and applications for purposes of automating the correction process or for purposes of alerting the proper entities that can fix the errors.

One of ordinary skill in the art appreciates how the techniques of method 100 automate and streamline metadata validation.

Conventionally, metadata validation was largely manual and done in a serial manner for each piece of metadata. With the validation service of FIG. 1, metadata validation is done for all affected or identified metadata associated with an application in mass. This permits all errors to be identified and addressed more efficiently; rather than attempting to find each error in a piecemeal and manual fashion, which has been conventionally the case.

Figure 2:
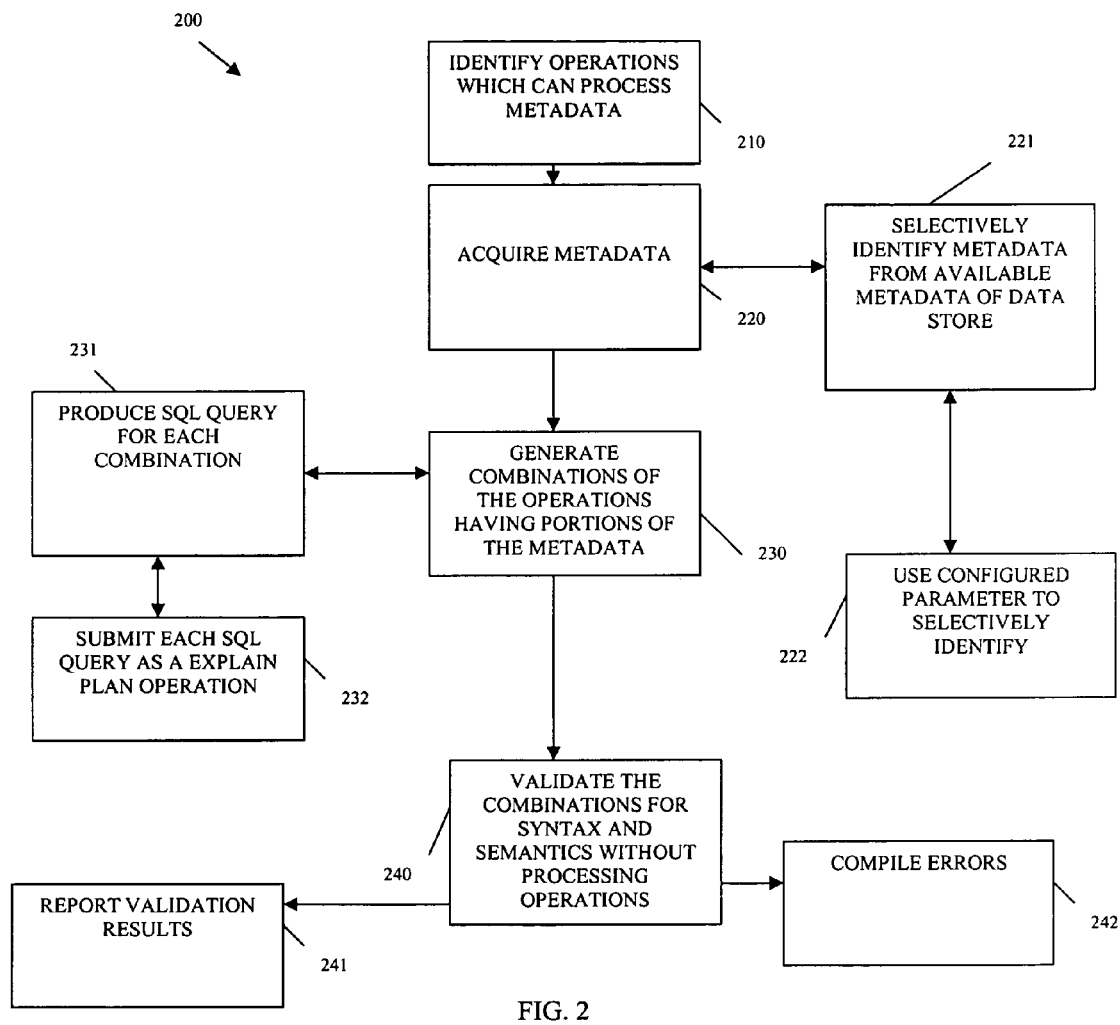
FIG. 2 depicts a diagram of another method for validating metadata, according to another example embodiment.

FIG. 2 is a diagram of another method 200 for automatically validating metadata, according to an example embodiment of the invention. The method 200 is implemented in a machine-accessible and readable medium and is optionally accessible over a network. In some embodiments, the processing of the method 200 is integrated within the processing of an application. In other embodiments, the processing of the method 200 is independent of the processing of an application.

At 210, operations associated with an application are categorized or otherwise identified with respect to the metadata types with which the operations can process. Parameter types associated with operations may be published by the application and available in an automated manner by processing other discovery operations associated with the application. Alternatively, parameter types may be captured in tables or other structures in an electronic form and made accessible to the processing of the method 200.

Next, available metadata associated with an application is acquired from data stores, directories, files, storage, and/or memory. In one embodiment, at 221, the metadata is selectively identified from a pool of available metadata. In some cases, at 222, the selectively identified metadata is determined based on configuration parameters supplied to the processing of the method 200. That is, interfaces associated with the processing of the method 200 may permit different types of metadata to be identified by an operator, or may permit operators to create profiles that identify the types of metadata. The selection and/or profiles serve as configuration parameters to the processing of the method 200.

Once the pool of metadata associated with an application is identified and the affected operations of the application known which consume the metadata, at 230, the processing of the method 200 generates combinations of the operations having portions of the acquired metadata. That is, the permutations of operations that may be generated based on values assigned to the acquired metadata results in a finite set or combination of specific operation instances being generated, at 230.

In one embodiment, at 231, the generated combinations of operations are SQL queries, where each query is associated with a different combination. This is useful when the application is a service associated with a data store application that interfaces with a data store via SQL queries. In this embodiment, at 232, each individually generated SQL query may be validated by submitting each query as an explain plan operation. This validates the syntax and semantics (metadata) of each query without actually processing the query against the data store.

At 240, each combination is validated for its syntax and semantics, without processing the individually generated operations against the application. That is, data stores are checked to ensure that the usage of metadata is properly defined in those data stores and syntax associated with the commands is validated to ensure that the syntaxes are in a recognized format that may actually be processed.

In one embodiment, at 241, the validation results are reported. Reporting or Notification can occur in a variety of manners. For example, maybe only metadata errors are reported, maybe both correct and incorrect metadata are reported. Moreover, reporting may entail automatically translating the results into formats recognized and processed by other automated applications. Conversely, reporting may result in notification to real or logical entities that may desire or need to know about errors. Furthermore, errors may be configured to be critical, such that when a critical error is detected, the method 200 ceases processing the remaining validation, since the critical error may actually have caused the remaining errors which were detected to be present. In fact, any configured use of the errors may be deployed with the validation results. That configured use may be automated, partially automated, and/or manual.

Therefore, in some embodiments, at 242, the processing of the method generates a compilation of validation errors. This compilation can be used in a variety of subsequent processing or procedures for purposes of correcting the metadata that is in error.

Figure 3:
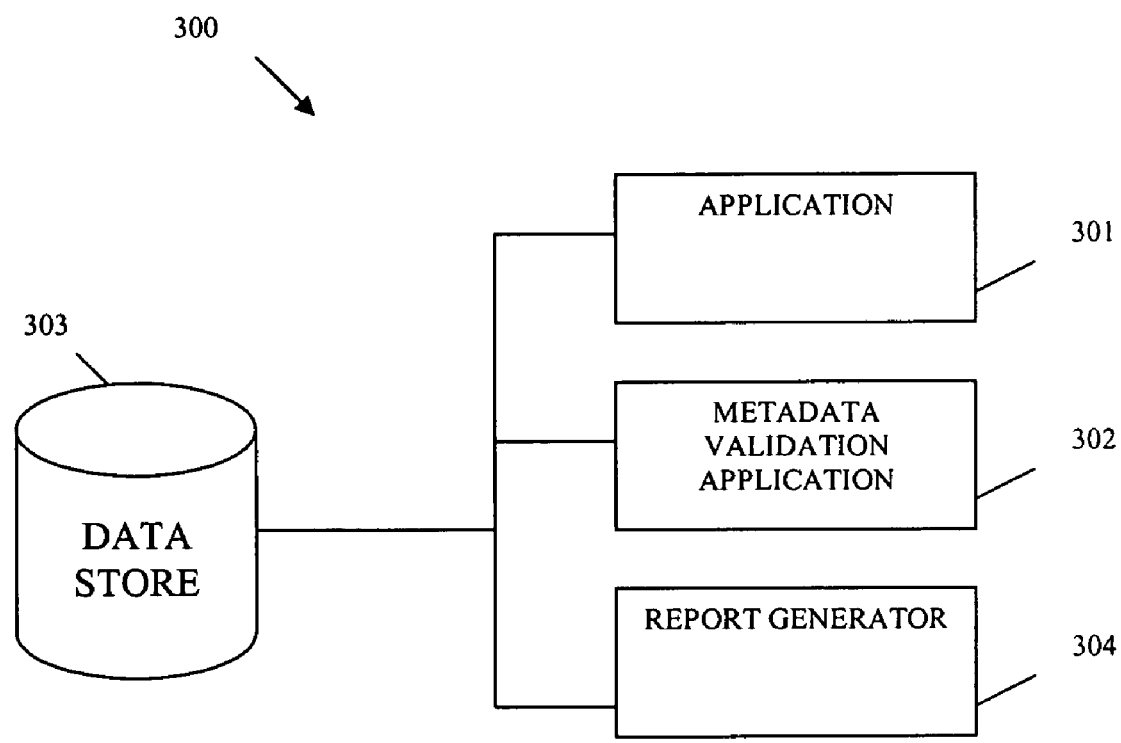
FIG. 3 depicts a diagram of a metadata validation system, according to an example embodiment.

FIG. 3 is a diagram of a metadata validation system 300, according to an example embodiment. The metadata validation system 300 is implemented in a machine-accessible and readable medium and is optionally accessible over a network. In one embodiment, the metadata validation system 300 implements, among other things the methods 100 and 200 of FIGS. 1 and 2. The metadata validation system 300 identifies metadata and operations associated with an application, and the metadata validation system 300 validates the metadata for the application before the metadata is actually processed by an operation of the application.

The metadata validation system 300 minimally includes an application 301 and a metadata validation application 302. In some embodiments, the metadata validation system 300 also includes a data store 303 and a report generator 304.

The application 301 may be any software developed service or system that utilizes metadata, which is designed to be used with the teachings of this invention. In one embodiment, the application 301 is a CRM product that interfaces to a data warehouse identified as data store 303.

More particularly, in one embodiment, the application 301 is the CRM Teradata product distributed by NCR Corporation of Dayton, Ohio, and the data store is the Teradata data warehouse also distributed by NCR Corporation of Dayton, Ohio. Of course, the application 301 and data store 303 are not limited to any specific application or data store. In fact, any application 301 and data store 303 designed to cooperated within the metadata validation system 300 in the manners described herein is intended to fall within the scope of the invention.

The application 301 has certain requirements associated with types of metadata and types of operations that process defined types of metadata. These requirements are acquired in an electronic environment by the metadata validation application 302. The metadata validation application 302 may be integrated within the application 301 and thus accessible through interfaces of the application 301. Alternatively, the metadata validation application 302 may be separate and distinct from the application 301.

The metadata validation application 302 selectively acquires metadata associated with the application 301. This selective acquisition may be done based on operator provided parameters or based on profiles or other configuration data associated with the metadata validation application 302.

The metadata validation application 302 determines the types associated with each portion of the selective metadata and in response to these types identifies the operations that the application 301 possesses which can process the metadata. Next, the metadata validation application 302 generates specific instances or combinations of instances for the operations, each instance having a different portion of the acquired metadata. Once the combinations of operations and metadata are assembled, the metadata validation application 302 validates each combination.

In one embodiment, the operations are search queries associated with an application that uses a data store query language, such as SQL. Each search query is a different search having different combinations of the metadata. Each search is then validated by submitting each search as a explain plan operation to the data store query language. Thus, the searches are not executed against the data store, but are syntactically and semantically validated by the operations of the metadata validation application 302.

The metadata validation application 302 semantically and syntactically validates the metadata included in the combinations of operations and the syntax of those operations, without actually executing the operations within the application.

In one embodiment, the metadata validation system 300 includes a data store 303 that includes the metadata and primary data associated with the metadata. In these embodiments, the application 301 and the metadata validation application 302 are interfaced to the data store 303 and operable to process a data store query language to access the metadata and primary data.

In yet another embodiment, the metadata validation system 300 includes a report generator 304. The report generator 304 compiles, logs, and/or notifies other entities (logical or physical) about validation results, which are produced by the metadata validation application 302. The report generator 304 may be configured to organize errors in manners desired and to interface with other services or systems for further automation.

In some cases, the metadata validation application 302 is accessed and callable from within sub-interfaces of the application 301. That is, in one embodiment, an operator interfaced to the application may access a pull-down menu of the application 301 to select the metadata validation application 302. Once accessed, the metadata validation application 302 may include its own operator interfaces that permit the operator to selectively identify metadata and validate that metadata. Other interfaces of either the application 301 or the metadata validation application may include interfaces to access or call the report generator 304.

The techniques presented herein demonstrate how metadata associated with an application can be more efficiently validated in automated manners. This improves conventional approaches which have largely been time intensive and manual.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which interpreted as reflecting an intention that the claimed embodiments of the invention have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A machine-implemented method to validate metadata embodied as instruction, the instructions when executed by a machine perform the method of
   receiving, on the machine, a request to validate metadata within an application while the application is processing on the machine and wherein the request is received within a version of the application that is executing on the machine, wherein the request is an option of the application itself;
   acquiring, on the machine, the metadata associated with the request;
   generating, on the machine, search operations for the application for which the metadata can be associated with; and
   validating, on the machine, the operations having the metadata before the operations are processed, and wherein the operations are data store search queries in a data store query language, and wherein the metadata is selectively identified based on configuration parameters supplied as a profile and combinations include permutations of the operations that can be generated in response to values assigned to the metadata to define a finite set of specific operation instances, and wherein the metadata identifies a name for a database table and a field of that database table for which the search queries are to be conducted using the values assigned to the database table and the field.

2. The method of claim 1 further comprising, generating, on the machine, a log for each operation after validation which indicates whether each operation was validated or not validated.

3. The method of claim 1 further comprising, updating, on the machine, a progress log with results of the validation.

4. The method of claim 1, wherein validating further includes submitting each operation to an explain plan operation associated with the data store query language.

5. The method of claim 1, wherein generating further includes identifying available operations to which the metadata may be processed within the application and generating each of those operations with the metadata.

6. A machine-implemented method to validate metadata embodied as instructions, the instructions when executed by a machine perform the method of:
   identifying, on the machine, search operations for an application which can process metadata as SQL search queries against a database, wherein the operations are categorized in response to metadata types for the metadata that the operations can process;
   acquiring, on the machine, the metadata, wherein the metadata is selectively identified based on configuration parameters supplied as a profile, and wherein the metadata identifies names for database tables and fields for those database tables;
   generating, on the machine, combinations of the operations having portions of the metadata, wherein the combinations include permutations of the operations that can be generated in response to values assigned to the metadata to define a finite set of specific operation instances; and
   validating, on the machine, the combinations for syntax and semantics, without executing the operations to produce a compilation of validation errors for the combinations by processing a database explain plan operation for each of the combinations of the operations against the database.

7. The method of claim 6 further comprising, reporting, on the machine, results associated with the validation.

8. The method of claim 6 further comprising, selectively identifying, on the machine, the metadata from a database of available metadata.

9. The method of claim 6, wherein generating further includes producing an SQL query for each combination.

10. The method of claim 9, wherein validating further includes submitting each SQL query as a explain plan operation.

11. The method of claim 6 further comprising, compiling, on the machine, errors associated with the validation in a report.

* * * * *